United States Patent
Maegawa et al.

(10) Patent No.: US 11,838,679 B2
(45) Date of Patent: Dec. 5, 2023

(54) INFRARED IMAGING DEVICE

(71) Applicant: Mitsubishi Electric Corporation, Tokyo (JP)

(72) Inventors: Tomohiro Maegawa, Tokyo (JP); Hiroshi Hirosaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 17/434,358

(22) PCT Filed: Jun. 12, 2019

(86) PCT No.: PCT/JP2019/023194
§ 371 (c)(1),
(2) Date: Aug. 26, 2021

(87) PCT Pub. No.: WO2020/250327
PCT Pub. Date: Dec. 17, 2020

(65) Prior Publication Data
US 2022/0159199 A1 May 19, 2022

(51) Int. Cl.
*H04N 5/33* (2023.01)
*G01J 5/0804* (2022.01)
(Continued)

(52) U.S. Cl.
CPC ............. *H04N 5/33* (2013.01); *G01J 5/0804* (2022.01); *G01K 1/14* (2013.01); *G01J 2005/0077* (2013.01)

(58) Field of Classification Search
CPC .. H04N 5/33; G01J 5/0804; G01J 2005/0077; G01J 5/80; G01J 5/70; G01K 1/14
See application file for complete search history.

(56) References Cited

U.S. PATENT DOCUMENTS

| 6,515,285 B1 | 2/2003 | Marshall et al. |
| 2011/0228809 A1* | 9/2011 | Tadigadapa .......... G01K 17/006 29/25.35 |

FOREIGN PATENT DOCUMENTS

| JP | 2001-174329 A | 6/2001 |
| JP | 2002-310804 A | 10/2002 |

(Continued)

OTHER PUBLICATIONS

The extended European search report issued by the European Patent Office dated Jun. 8, 2022, which corresponds to European Patent Application No. 19932744.6-1020 and is related to U.S. Appl. No. 17/434,358.

(Continued)

*Primary Examiner* — Farzana Hossain
(74) *Attorney, Agent, or Firm* — Studebaker & Brackett PC (57) ABSTRACT

An infrared imaging device comprises an infrared imaging sensor to detect infrared light as heat, a temperature drift compensation amount calculator to calculate a temperature drift compensation amount in accordance with a temperature change of the substrate, with respect to a pixel output outputted from each of the plurality of pixels, a compensation amount calculation function generator to generate a function with the temperature of the substrate as an independent variable; and a timing controller to cause the infrared imaging sensor and the substrate temperature sensor to synchronously output data to the compensation amount calculation function generator for generating the function, wherein the compensation amount calculation function generator uses the data for generation output after the generation of the function as additional data for improving accuracy of the function.

19 Claims, 8 Drawing Sheets

(51) Int. Cl.
*G01K 1/14* (2021.01)
*G01J 5/00* (2022.01)

(56) References Cited

FOREIGN PATENT DOCUMENTS

| | | |
|---|---|---|
| JP | 2004-117000 A | 4/2004 |
| JP | 2008-268155 A | 11/2008 |
| JP | 2012-230077 A | 11/2012 |

OTHER PUBLICATIONS

International Search Report issued in PCT/JP2019/023194; dated Sep. 10, 2019.
An Office Action mailed by China National Intellectual Property Administration dated Jul. 16, 2023, which corresponds to Chinese Patent Application No. 201980096792.8 and is related to U.S. Appl. No. 17/434,358; with English language translation.

* cited by examiner

# INFRARED IMAGING DEVICE

TECHNICAL FIELD

The present application relates to an infrared imaging device.

BACKGROUND ART

In a thermal infrared imaging device, temperature sensors constituting pixels are arrayed two dimensionally to form an imaging sensor having a thermally insulated structure, and an infrared image is captured by utilizing the fact that the temperature of the pixels changes in accordance with incident infrared light. However, in the infrared imaging device, not only a temperature change as an infrared sensitivity but also a self-heating temperature change of the temperature sensor itself due to application of a current or a voltage and a self-heating temperature change of the entire infrared imaging device generated in components other than the imaging sensor occur simultaneously.

In this case, the degree of self-heating varies due to variations in thermal insulation performance, the amount of power consumption, the applied voltage, or the current amount for each of the pixels due to manufacturing variation in the imaging sensor or its peripheral members, and thus an output level differs for each of the pixels. In addition, since the thermal insulation performance and the amount of the power consumption for each of the pixels change due to the ambient temperature, the output level variation due to the ambient temperature variation is significant.

Among these problems, regarding the performance change due to the ambient temperature, a method of compensating an infrared sensor signal by performing a compensation process using a table of compensation coefficients in accordance with the ambient temperature and the temperature of an subject to be measured (for example, refer to Patent Document 1) has been proposed. Further, regarding the output level difference in each of the pixels, a method using a shutter mechanism for performing calibration to level the sensitivity of the pixels (for example, refer to Patent Document 2) has been proposed.

CITATION LIST

Patent Document

Patent Document 1: Japanese Patent Application Laid-open No. 2012-230077 (Paragraphs 0135 to 0139, Table 1)
Patent Document 2: Japanese Patent Application Laid-open No. 2004-117000 (Paragraphs 0014 to 0022, FIGS. 1 to 3)

SUMMARY OF INVENTION

Problems to be Solved by Invention

However, in the compensation process using the compensation coefficients, it is not possible to cope with a change in the heat dissipation performance affected by a mounting condition of the infrared imaging device or fluctuation in the power supply voltage, and thus accurate compensation is not always possible. In addition, relying on the calibration by the shutter mechanism leads to an increase in the frequency of the calibration, and thus it is undesirable that the time during which no image can be captured increases.

It is an object of the present application to provide an infrared imaging device that can reduce the influence of the mounting condition and the voltage fluctuation and shorten the time during which no image can be captured.

Means for Solving Problems

An infrared imaging device according to the present application comprises an infrared imaging sensor in which a plurality of pixels for detecting incident infrared light as heat are arrayed, a substrate temperature sensor to measure a temperature of a substrate on which the infrared imaging sensor is mounted, a temperature drift compensation amount calculation unit to calculate a temperature drift compensation amount in accordance with a temperature change of the substrate, with respect to a pixel output outputted from each of the plurality of pixels, a function generation unit to generate a function for calculating the temperature drift compensation amount with the temperature of the substrate as an independent variable, and a timing control unit to cause the infrared imaging sensor and the substrate temperature sensor to synchronously output data to the function generation unit during a period in which the temperature of the substrate changes along with a start of energization to the substrate, as data for generation to generate the function, wherein the function generation unit uses the data for generation output after the generation of the function as additional data for improving accuracy of the function.

Effect of Invention

According to the infrared imaging device disclosed in the present application, since the function used for the compensation is made more accurate using additional data, it is possible to obtain the infrared imaging device that can reduce the influence of the mounting condition and the voltage fluctuation and shorten the time during which no image can be captured.

MODES FOR CARRYING OUT INVENTION

Embodiment 1

Figure 1:
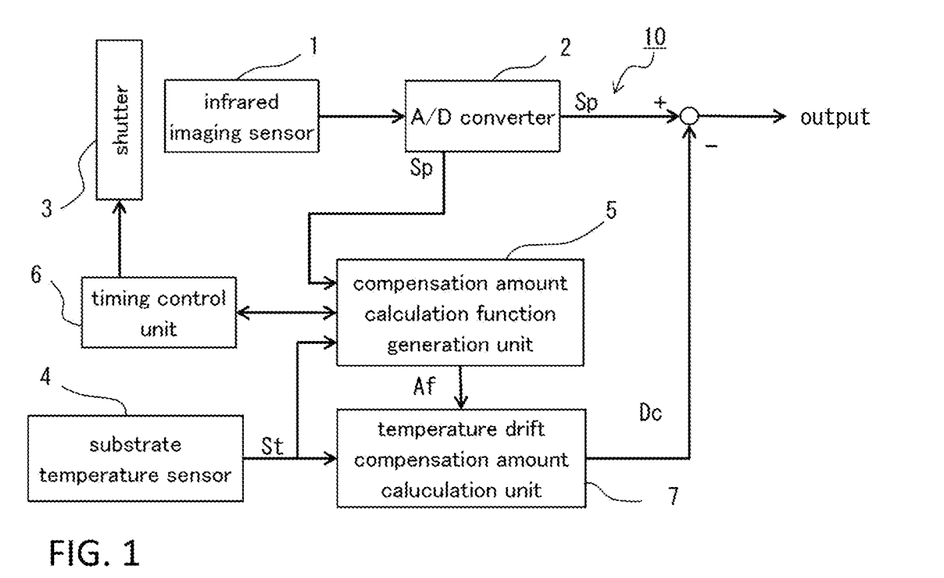
FIG. 1 is a functional block diagram of an infrared imaging device according to Embodiment 1.
Figure 2:
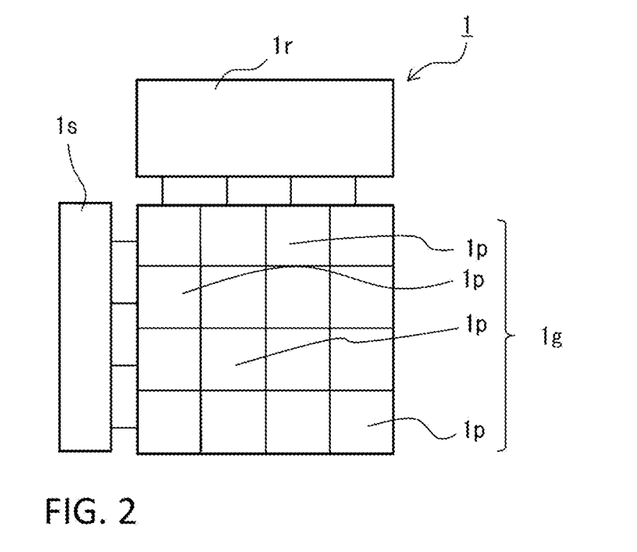
FIG. 2 is a schematic diagram showing a configuration of the infrared imaging sensor in the infrared imaging device according to Embodiment 1.
Figure 3:
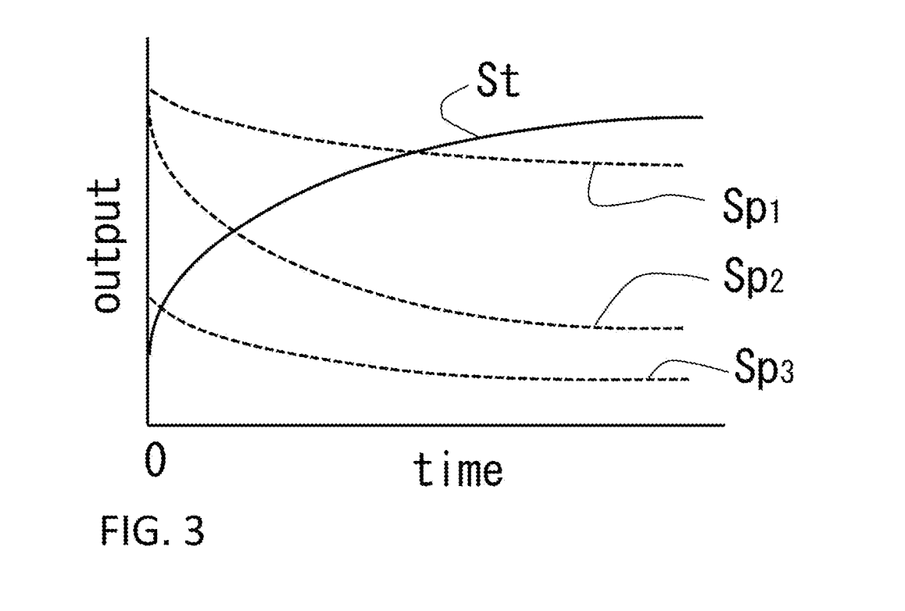
FIG. 3 is a diagram showing changes over time in pixel outputs and a temperature sensor output in the infrared imaging device according to Embodiment 1.
Figure 4:
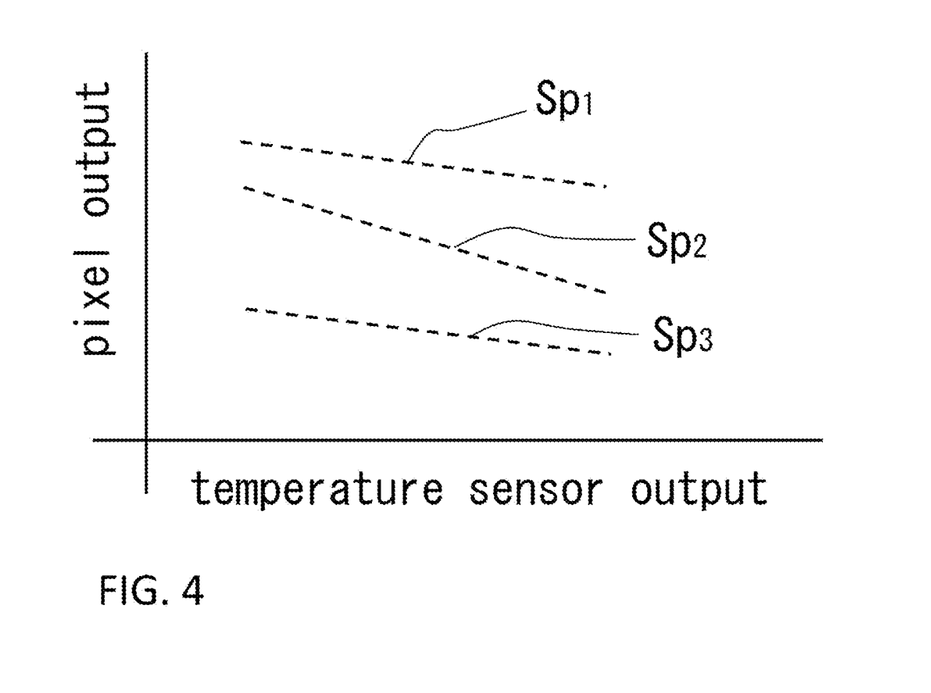
FIG. 4 is a diagram showing a relationship between the temperature sensor output and the pixel outputs in the infrared imaging device according to Embodiment 1.

FIG. 1 to FIG. 7 illustrate an infrared imaging device according to Embodiment 1, and FIG. 1 is a functional block diagram showing an entire configuration of the infrared imaging device, and FIG. 2 is a schematic diagram showing a configuration of the infrared imaging device. FIG. 3 is a diagram showing changes over time in a pixel output of each of three pixels and a temperature sensor output when the infrared imaging device is started up, and FIG. 4 is a diagram showing a relationship between the temperature sensor output and the pixel output of each of the three pixels which change over time when the infrared imaging device is started up.

Figure 5:
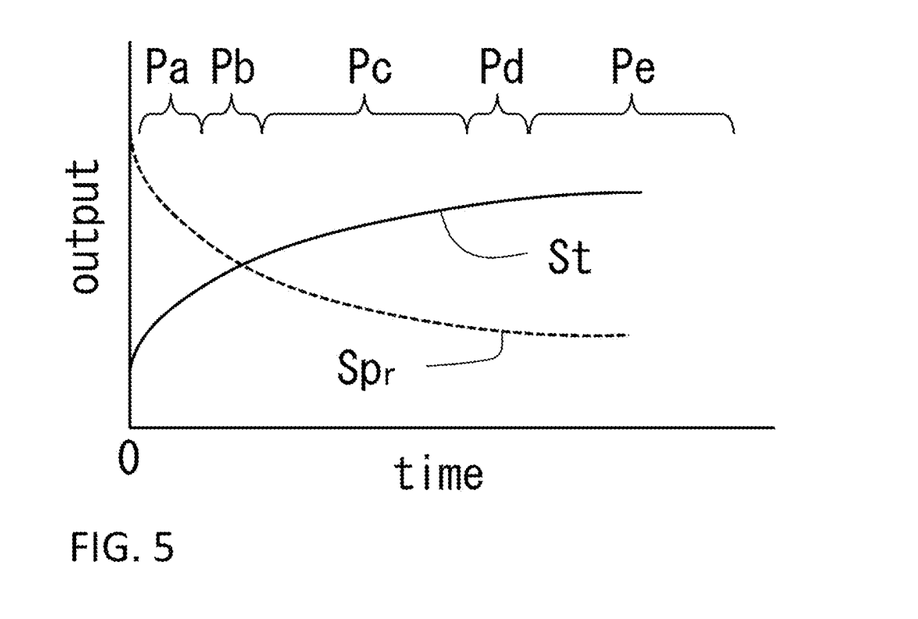
FIG. 5 is a diagram showing changes over time in the temperature sensor output and in a representative pixel output, and control timing in the infrared imaging device according to Embodiment 1.
Figure 6:
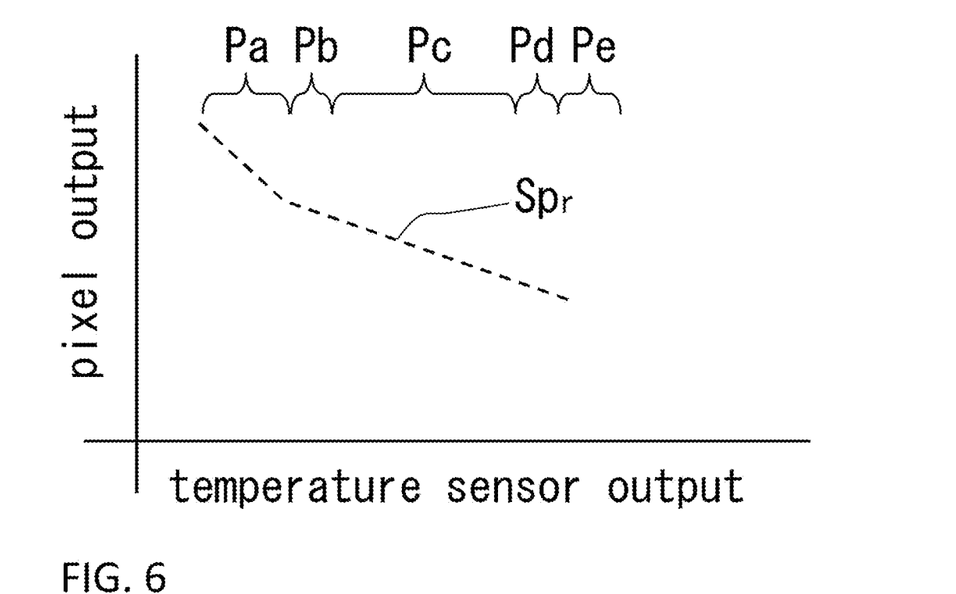
FIG. 6 is a diagram showing a relationship of the representative pixel output and the control timing with respect to the temperature sensor output in the infrared imaging device according to Embodiment 1.
Figure 7:
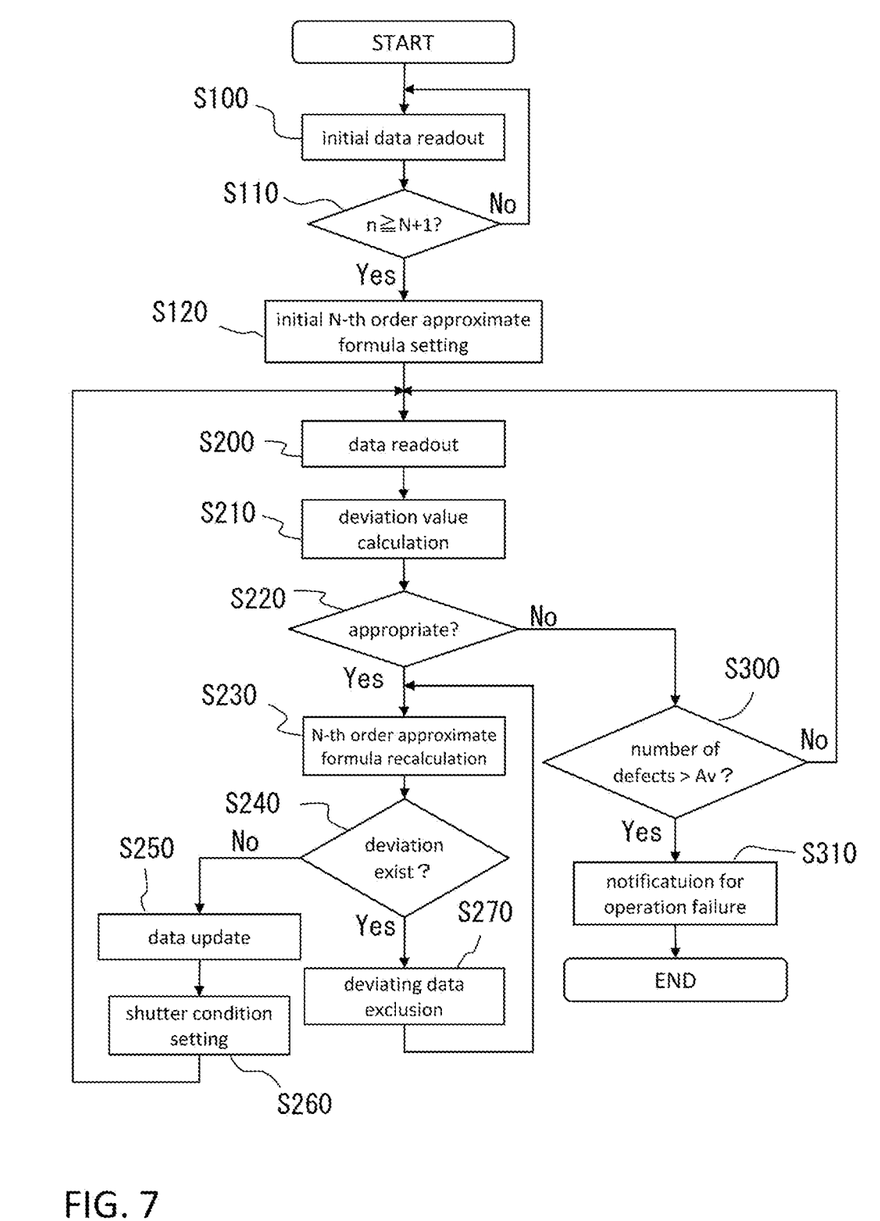
FIG. 7 is a flowchart showing self-learning operation in a compensation amount calculation function generation unit in the infrared imaging device according to Embodiment 1.

Further, FIG. 5 is a diagram showing changes over time in the temperature sensor output and in a representative pixel output, and control timing in accordance with the changes over time when the infrared imaging device is started up. FIG. 6 is a diagram showing a relationship of the representative pixel output with respect to the temperature sensor output that changes with time, and a relationship of the control timing in accordance with the substrate temperature sensor or the representative pixel output. FIG. 7 is a flowchart showing self-learning operation for improving accuracy of an approximate formula (function) in a compensation amount calculation function generation unit included in the infrared imaging device.

The configuration and operation of the infrared imaging device according to Embodiment 1 or of the infrared imaging device common to each of embodiments will be described below using the drawings. As shown in FIG. 1, the infrared imaging device 10 includes, as main components, an infrared imaging sensor 1 that receives incident infrared light and converts it into an analog electric signal, and an analog-to-digital converter (hereinafter referred to as A/D converter 2) that receives the signal, converts it into a digital signal, and outputs the digital signal.

As shown in FIG. 2, the infrared imaging sensor 1 has a plurality of pixels 1p preferably arrayed two dimensionally as a pixel part 1g, which senses infrared light as heat due to a change in electrical characteristics caused by a rise in temperature when incident infrared light is received and outputs it as an electrical signal. A drive line selection circuit 1s for controlling the timing of energization for each pixel 1p and a readout circuit 1r for amplifying and reading out a signal component output from each pixel 1p of the pixel part 1g are provided. The signal of each pixel 1p is sequentially output from the readout circuit 1r.

Here, the signal component of each pixel 1p includes a component of infrared light emitted from a subject, and also includes a substrate temperature component, a self-heating component due to energization, and a component of infrared light emitted from optical system members such as lenses, and a lens barrel holding the optical system members, and the like. That is, the signal component of the infrared imaging device 1 varies depending on the mounting condition, fluctuation of the power supply voltage to be applied, and the like.

Therefore, a substrate temperature sensor 4 for measuring the temperature of a mounting substrate (not shown) and a temperature drift compensation amount calculation unit 7 for calculating a temperature drift compensation amount for compensating a digital value outputted from the A/D converter 2 by subtraction processing in accordance with an output of the substrate temperature sensor 4 are provided. At this time, it is preferable that the mounting substrate and the infrared imaging device 1 be bonded to each other by a conductive or non-conductive adhesive, and the substrate temperature sensor 4 be bonded to the mounting substrate by an adhesive or a solder material so that the tendency in the temperature change of the infrared imaging device 1 and the substrate temperature sensor 4 can be the same. Accordingly, the output (temperature) change of the substrate temperature sensor 4 can be regarded as equivalent to the output change of the infrared imaging device 1.

Further, a shutter 3 for blocking the infrared light incident on the infrared imaging sensor 1, and a timing control unit 6 for controlling operation timing of the shutter 3 and for causing related parts to operate in synchronization when shutter calibration processing is performed are provided. The shutter 3 is disposed in the subject detection direction of the infrared imaging sensor 1 and is preferably made of material having a low thermal conductivity and a small heat capacity. Preferably, the surface emissivity is 0.95 or more. As a result, the shutter 3 can be regarded as having the same temperature as the ambient temperature regardless of the mounting condition or the fluctuation of the power supply voltage to be applied, and the tendency of the temperature change in the infrared imaging sensor 1, the lens barrel, the lens, and the like at the time of acquiring compensation data shown later can be extracted with high accuracy.

The configuration described above is the same as a configuration required for a typical infrared imaging device in which shutter calibration is performed. In contrast, in the infrared imaging device 10 of the present application, a compensation amount calculation function generation unit 5 is provided as a part for performing the shutter calibration processing. The compensation amount calculation function generation unit 5 generates an approximate formula (function Af) for calculating a temperature drift compensation amount for each of the pixels in accordance with the substrate temperature from the output from the A/D converter 2 and the output from the substrate temperature sensor 4 in synchronization with the shutter operation, and performs processing for improving the accuracy of the formula by self-learning the adequacy of the data. Further, the shutter timing for performing effective shutter calibration with less frequency is self-learned and calculated.

Here, flows of signals and data in the infrared imaging device 10 are reconfirmed. An analog signal component output from the infrared imaging sensor 1 is converted into a digital signal by the A/D converter 2 and the signal is input to the compensation amount calculation function generation unit 5 as a pixel output Sp. A temperature sensor output St indicating the substrate temperature output from the substrate temperature sensor 4 is also input to the compensation amount calculation function generation unit 5 at the same time. The timing control unit 6 generates a control or operation command signal to synchronize the operation timing of the shutter 3 with signal acquisition timing of the compensation amount calculation function generation unit 5 described later.

The compensation amount calculation function generation unit 5 acquires the signals from the A/D converter 2 and the substrate temperature sensor 4 in accordance with the timing of receiving the operation command signal from the timing control unit 6, and temporarily stores them in a memory (not shown). Then, using signals from the A/D converter 2 and the substrate temperature sensor 4 multiple times, an N-th order approximate function Af is generated from the relationship between the output of the substrate temperature sensor 4 and the output of the A/D converter 2.

Therefore, it is preferable that the compensation amount calculation function generation unit 5 holds a memory capacity so that signals from the A/D converter 2 and the substrate temperature sensor 4 can be temporarily stored for multiple times. The N-th order approximate function Af generated by the compensation amount calculation function generation unit 5 is preferably generated in accordance with each pixel 1p, but may be generated using an average value of the outputs from a plurality of pixels among the signals output from the two dimensionally arrayed pixels 1p when precise compensation is not necessary.

The signal acquisition timing of the compensation amount calculation function generation unit 5, which is controlled by the timing control unit 6, is performed two or more times, and more preferably four or more times during a period in which temperature fluctuation occurs due to heat generated by energization after the infrared imaging device 10 is turned on. Signals obtained at the signal acquisition timing of the compensation amount calculation function generation unit 5 needs to be the signals in a period in which the shutter 3 is completely operated, and a timing difference from the operation start may be generated. Further, while the shutter 3 continues to be operated once, signals may be acquired multiple times from the A/D converter 2 and the substrate temperature sensor 4, and the case including the above is also referred to as "synchronization".

In addition, it is preferable that the operation timing of the shutter 3 controlled by the timing control unit 6 and the signal acquisition timing of the compensation amount calculation function generation unit 5 be set in a period except for an unstable period (for example, period Pa in FIG. 5) immediately after the start of the energization in which the device operation is electrically unstable. Since various bias conditions in the device are not stabilized immediately after the start of the energization, as a result, it is possible to prevent the N-th order approximate function Af generated in the compensation amount calculation function generation section 5 from being inaccurate.

The temperature drift compensation amount calculation unit 7 calculates a temperature drift compensation amount Dc, which is compensation data for each of the pixels 1p and is in accordance with the signal from the substrate temperature sensor 4, from the N-th order approximate function Af obtained by the compensation amount calculation function generation unit 5. Accordingly, it is possible to predict a signal generated from the infrared imaging sensor 1 in accordance with the substrate temperature sensor 4 and outputted via the A/D converter 2. Finally, the output for each of the pixels 1p can be leveled by subtraction operation of an output from the temperature drift compensation amount calculation unit 7 (temperature drift compensation amount Dc) from the output of the A/D converter 2 (pixel output Sp).

Next, compensation contents will be described in more detail. The pixel output Sp of each pixel 1p output from the A/D converter 2 (typically, pixel outputs Sp1, Sp2, and Sp3 of the respective three pixels 1p are shown) and the temperature sensor output St output from the substrate temperature sensor 4 change over time as shown in FIG. 3. When the power to the infrared imaging device 10 (substrate thereof) is turned on (time=0), the temperature changes due to heat generated by energization, and the output value of the substrate temperature sensor 4 increases with time.

As described above, since the substrate temperature sensor 4 and the infrared imaging sensor 1 are configured to have the same tendency in the output change, the temperature of the infrared imaging sensor 1 rises, but the temperature of the shutter 3 configured to have the same temperature as the ambient temperature does not change. Therefore, the signal during the operation of the shutter 3, that is, the pixel output Sp (referred to as a shutter imaging signal) output when the shutter 3 is captured, falls as the temperature sensor output St rises.

Note that the shutter imaging signal includes not only the influence of the temperature change of the lens barrel and the optical system members but also the influence of an output level difference or of a temperature drift component difference for each of the pixels 1p. In addition, since it is based on the acquired data in which the mounting condition of the infrared imaging device 10 or the power supply voltage to be applied is already established, the above-described variation factors are included.

In the shutter calibration, as shown in FIG. 4, the relationship of the shutter imaging signal (pixel output Sp) for each of the pixels 1p with respect to the temperature sensor output St is derived from the temperature sensor output St and the shutter imaging signal that change over time when the device is started up, which is described referring to FIG. 3. Specifically, the compensation amount calculation function generation unit 5 generates the N-th order approximate function Af of the temperature sensor output St for each of the pixels 1p from the pixel output Sp for each of the pixels 1p output from the A/D converter 2 and the temperature sensor output St output from the substrate temperature sensor 4, and outputs the function Af to the temperature drift compensation amount calculation unit 7.

The temperature drift compensation amount calculation unit 7 substitutes the temperature sensor output St output from the substrate temperature sensor 4 at the point in time into the N-th order approximate function Af for each of the pixels 1p output from the compensation amount calculation function generation unit 5 to generate the temperature drift compensation amount Dc for each of the pixels 1p. The generated temperature drift compensation amount Dc for each of the pixels 1p takes into account all of the mounting condition of the infrared imaging device 10, the fluctuation of the power supply voltage to be applied, the influence of the temperature change in the lens barrel and the optical system members, the output level difference for each of the pixels 1p, and the temperature drift component difference for each of the pixels 1p.

As a result, image compensation can be performed with higher accuracy than when predetermined compensation data is used. Further, since the temperature drift compensation amount Dc can be calculated in a stepless manner in accordance with the temperature change of the infrared imaging device 10, the frequency of shutter calibration can be reduced as compared with the case where calibration for taking compensation data for each temperature range is executed. At the same time, since it is not necessary to prepare compensation data in advance, the manufacturing cost can be greatly reduced.

Here, an example of setting the control timing in the timing control unit 6 will be described referring to FIG. 5 showing changes over time in the output of the representative pixel (representative pixel output Spr) and the temperature sensor output St, and FIG. 6 showing the relationship between the temperature sensor output St and the representative pixel output Spr in FIG. 5. Immediately after the infrared imaging device 10 is turned on, various power-up sequences are started in the period Pa, but a certain time is typically required until the operation is stabilized. If the shutter calibration is executed in this period Pa, the N-th order approximate function Af generated in the compensation amount calculation function generation unit 5 becomes inaccurate, and thus it is preferable not to use the function Af as the calculation data.

Next, after the operation of the infrared imaging device 10 is stabilized, the shutter 3 is operated in the period Pb, and the shutter imaging signal is acquired by the compensation amount calculation function generation unit 5, and at the same time, the temperature sensor output St from the substrate temperature sensor 4 is acquired. Next, the shutter 3 is released in the period Pc. At this time, if the N-th order approximate function Af is yet undetermined in the compensation amount calculation function generation unit 5, the compensation may be performed using the shutter imaging signal acquired in the period Pb. In this case, since a sequential calculation cannot be performed with respect to the device temperature change (substrate temperature change), an image acquisition becomes possible although the accuracy is low.

Next, the shutter 3 is operated in the period Pd, and the shutter imaging signal is acquired by the compensation amount calculation function generation unit 5, and at the same time, the temperature sensor output St from the substrate temperature sensor 4 is acquired. A first order approximate function Af for the pixel output Sp of each of the pixels $1p$ is generated in a compensation amount calculation function generation unit 5 from the shutter imaging signal acquired during the period Pb and the shutter imaging signal acquired during the period Pd.

Next, the shutter 3 is released in the period Pe. The temperature drift compensation amount calculation unit 7 successively generates the temperature drift compensation amount Dc on the basis of the first order approximation function Af of the pixel output Sp for each of the pixels $1p$ generated during the period Pd and the temperature sensor output St from the substrate temperature sensor 4. And then, by the subtraction operation of the temperature drift compensation amount Dc output from the temperature drift compensation amount calculation unit 7 from the pixel output Sp of the A/D converter 2, the output for each of the pixels $1p$ is leveled. As a result, it is possible to perform the sequential calculation with respect to the substrate temperature change, and it is possible to level the image signal with high accuracy.

Further, if necessary, after the period Pe, the shutter 3 is operated several times, the shutter imaging signal is acquired by the compensation amount calculation function generation unit 5, and at the same time, the temperature sensor output St from the substrate temperature sensor 4 is acquired. From these data, the compensation formula for the pixel output Sp of each of the pixels $1p$ can be made higher in its order to a quadratic function and to a cubic function in the compensation amount calculation function generation unit 5.

The period Pc may be set such that the output of the substrate temperature sensor 4 shows a variation equal to or greater than a signal component error, and the time thereof may be set in advance, or the period may be set by monitoring the output variation amount of the substrate temperature sensor 4. In the period Pc, since the sequential calculation cannot be performed with respect to the substrate temperature change, the accuracy in the image acquisition is low. However, if this is not a problem, it is preferable that the output variation of the substrate temperature sensor 4 should be set to be large.

The timing of the period Pb and the period Pd must be determined in consideration of the time required for the stable operation of the device. In other words, it is preferably set in advance on the basis of a signal caused by the power-on of the device. By the operation of the timing control unit 6, the image acquisition is possible in a period excluding the unstable operation state immediately after the startup and the operation timing of the shutter 3 several times. Further, as the number of operations of the shutter 3 is increased, the compensation formula calculated by the compensation amount calculation function generation unit 5 can be made into a higher order so that the compensation accuracy can be gradually improved.

Since this compensation formula takes into account the mounting condition of the infrared imaging device 10, fluctuation of the power supply voltage to be applied, and the like, the image compensation can be performed with high accuracy as compared with preset compensation data, and the frequency of shutter calibration can be reduced by successively changing the compensation data for each of the temperature changes of the infrared imaging device 10. At the same time, since it is not necessary to prepare compensation data in advance, the manufacturing cost can be greatly reduced.

Further, the compensation amount calculation function generation unit 5 performs the generation of the N-th order approximate function by self-learning, and thereby the accuracy of the function Af is improved. The self-learning operation will be described referring to the flowchart of FIG. 7. For example, in the case of an initial state without data accumulation, the shutter calibration is performed at least N+1 times in order to generate the N-th order approximate function Af (steps S100 and S110). Then, from the combination of the shutter imaging signal (pixel output Sp) and the temperature sensor output St obtained by each shutter calibration, the function Af which is an N-th order approximate formula for each of the pixels $1p$ at the initial state is set by a calculation using the least squares method, etc., (step S120).

After the initial function Af is set in this manner, for example, the shutter calibration is performed at a predetermined timing among the start-up periods Pb to Pe, and data readout of the shutter imaging signal and the temperature sensor output St for each of the pixels $1p$ is performed (step S200). When the data is read out, a deviation value that deviates from the function Af set for each of the pixels $1p$ is calculated. Here, assuming that σ calculated by the least squares approximation is set to a threshold value Th, it is determined whether the data is appropriate data whose deviation value falls within the threshold value Th, that is, whether the data is good or bad (step S220).

If the data is determined to be good ("Yes" in step S220), the data is added to the data stored so far, and the N-th order approximate function Af is recalculated (step S230). Then, it is determined whether or not the deviation values of all the data are within the threshold value Th with respect to the recalculated function Af (step S240), and if the deviation values are within the threshold value Th (no deviation: "No"), the data subject to be stored is additionally updated (step S250).

In contrast, if there is data whose deviation value does not fall within the threshold value Th with respect to the recalculated N-th order approximate formula (deviation exist: "Yes" in step S240), the process proceeds to step S230 where the data deviating from the threshold value Th is excluded and the N-th order approximate function Af is recalculated. This process is repeated until "No" is obtained in step S240, and then the process proceeds to step S250.

After updating the data, a correlation coefficient in the N-th order approximate function Af is taken into consideration, the need for higher accuracy, that is, the need for additional data is confirmed, and the frequency of calibration is set again. If there is a data area in the temperature sensor output St that is insufficient in the source data for the N-th order approximate function Af, an optimal calibration timing is set from among the periods Pb to Pe so that the data area can be supplemented in the next calibration (step S260). That is, the need for the calibration is learned and an optimum shutter condition is set (step S260). As a result, even if the calibration is performed with less frequency, highly accurate N-th order approximation can be performed.

Meanwhile, if it is determined to be defective ("No") in step S220, it is determined whether or not, regarding the number of defects, the cumulative number of times determined as defective, the number of pixels 1p determined to be defective, or the latest number of times continuously determined as defective is within an allowable value Av (step S300). If the number of the defects is within the allowable value Av ("No"), the process proceeds to step S200 where the next calibration is simply executed. However, if the number of the defects exceeds the allowable value Av ("Yes"), it is determined that a defect has occurred in the device or the state has changed, and notification for the operation failure is issued (step S310), and the process ends.

Thus, it is possible to automatically detect the defect in the acquired data due to the control failure of the timing control unit 6 and the operation failure of the shutter 3 and calculate the optimum temperature drift compensation amount in accordance with the substrate temperature. In addition, if it is determined to be defective, it is possible to return to the original state by checking the mounting condition. Or, if the mounting condition is changed, the past data may be reset to perform calibration suitable for the new mounting condition.

Note that, in the defect determination, in addition to the number of pixels 1p, notification for the operation failure may be output when a range of the defect occurring in the pixel array, such as those occurring in a clump or in line shape, meets a certain condition. Alternatively, a non-volatile memory may be mounted in the compensation amount calculation function generation unit 5, and the N-th order approximate function Af calculated in the past and the N-th order approximate function Af newly acquired may be compared to detect a defective pixel 1p that occurs in time series or a sensor chip operation failure.

For example, when the function Af for each of the pixels 1p is an N-th order polynomial formula, the function Af is generated at the time of shipment inspection, and each of terms or a part of the coefficients is stored in the nonvolatile memory. Then, when the coefficient in each of the terms of the function Af approximated by the newly generated N-th order polynomial formula show a change equal to or greater than a predetermined threshold value, it may be determined that the pixel has become a defective pixel. In this case, the defect may be compensated by using an output value of the pixel 1p which is regarded as normal in its operation and is arranged around the pixel 1p which is regarded as the defective pixel. These methods enable early detection of defects or the like caused by changes over time and improvement in user convenience, and also improvement in the performance of the infrared imaging device such as improvement in the defect compensation accuracy.

In contrast to the above, when there is no self-learning, as described above, it is necessary to perform multiple shutter calibrations at each time of the start-up. However, in the case of the self-learning, after the initial function Af is set, for example, even if the shutter calibration is performed once at the start-up, a highly accurate approximate formula can be used, and the frequency of the shutter calibration can be surely reduced. Further, when the data at each start-up is stable, the shutter calibration may be performed not for each start-up but for any of the start-ups. It should be noted that the self-learning method in relation to the data acquisition as described above can bring about the same effect even when a function of calculating a compensation amount is generated using a variation amount relative to an initial value which will be described later.

Embodiment 2

Figure 8:
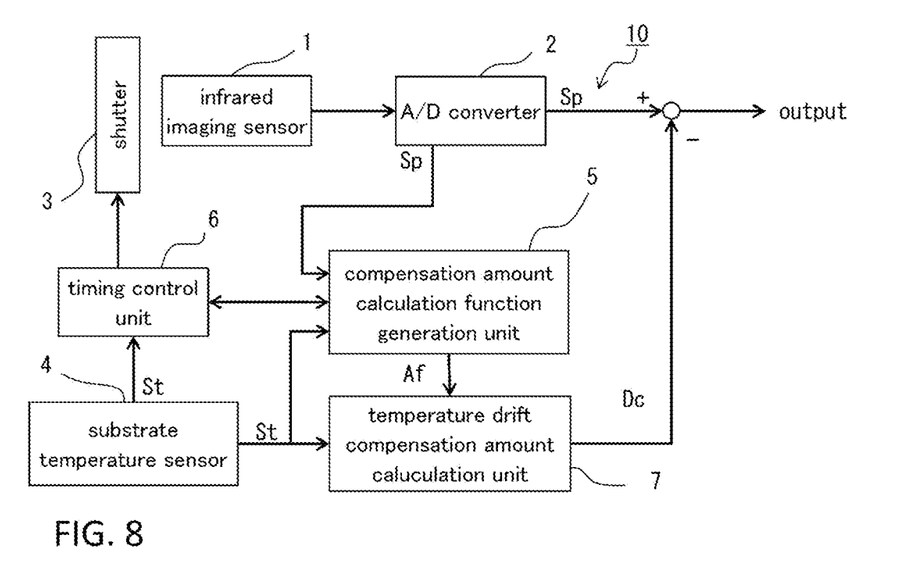
FIG. 8 is a functional block diagram of an infrared imaging device according to Embodiment 2.

In Embodiment 1, no particular description has been made to how the timing control unit determines the timing for operating the shutter in reality. In Embodiment 2, a configuration in which the timing control unit performs the shutter operation on the basis of a substrate temperature will be described. FIG. 8 is a functional block diagram showing an entire configuration of an infrared imaging device for the description on the infrared imaging device according to Embodiment 2. In the infrared imaging device according to Embodiment 2, the configuration except for a part related to the shutter operation control of the timing control unit is the same as the configuration described in Embodiment 1, and FIG. 2 to FIG. 7 described in Embodiment 1 are referred to, and the descriptions on the same components are not repeated.

As shown in FIG. 8, the infrared imaging device 10 according to Embodiment 2 is different from FIG. 1 of Embodiment 1 in that the temperature sensor output St from the substrate temperature sensor 4 is input to the timing control unit 6. When the temperature sensor output St that is input indicates a set value, shutter calibration operation is performed. Alternatively, when the value of the temperature sensor output St indicating the substrate temperature varies greatly, the shutter calibration operation is performed to increase the accuracy of the function Af or to set the function Af in accordance with the temperature range.

With this configuration, high-precision image compensation can be made, and the function of Embodiment 1 such as reduction in the shutter calibration frequency and significant reduction in the manufacturing cost can be definitely implemented. In addition, even if a temperature condition of the infrared imaging device 10, for example, a change in the ambient temperature, a change in climate, a change in the mounting condition of the infrared imaging device 10, or a change in an operating voltage occurs, the optimum function Af can be generated again each time.

Embodiment 3

Figure 9:
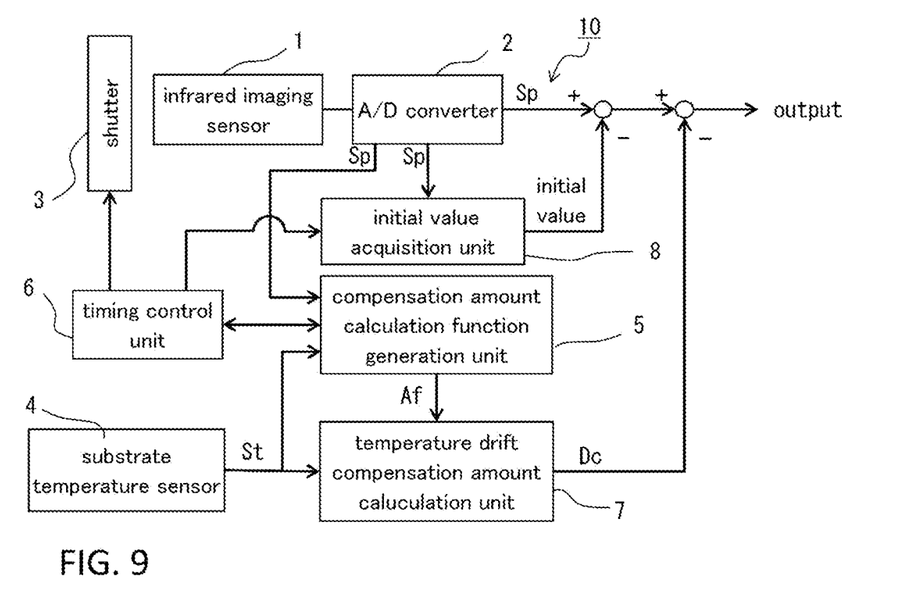
FIG. 9 is a functional block diagram of an infrared imaging device according to Embodiment 3.
Figure 10:
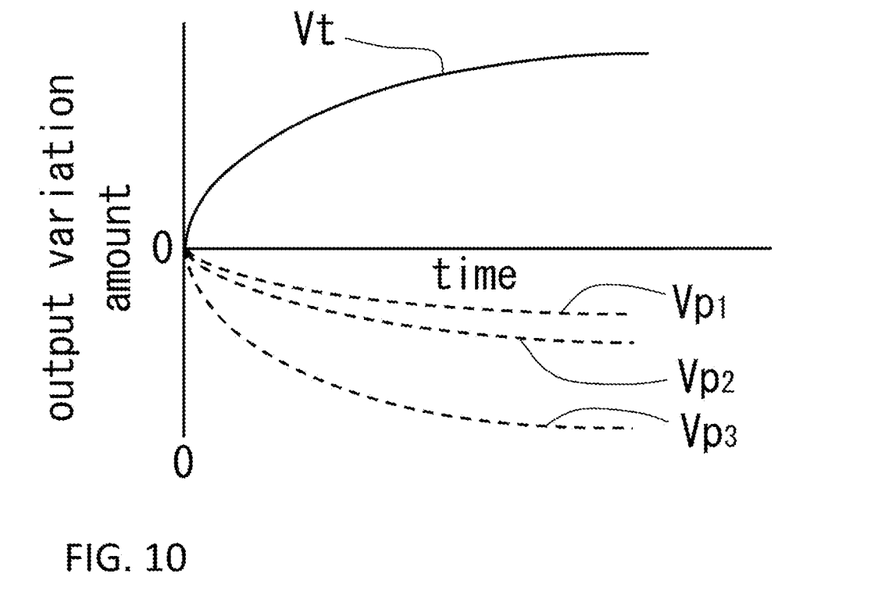
FIG. 10 is a diagram showing change amounts of pixel outputs and a change amount of a temperature sensor output over time in the infrared imaging device according to Embodiment 3.
Figure 11:
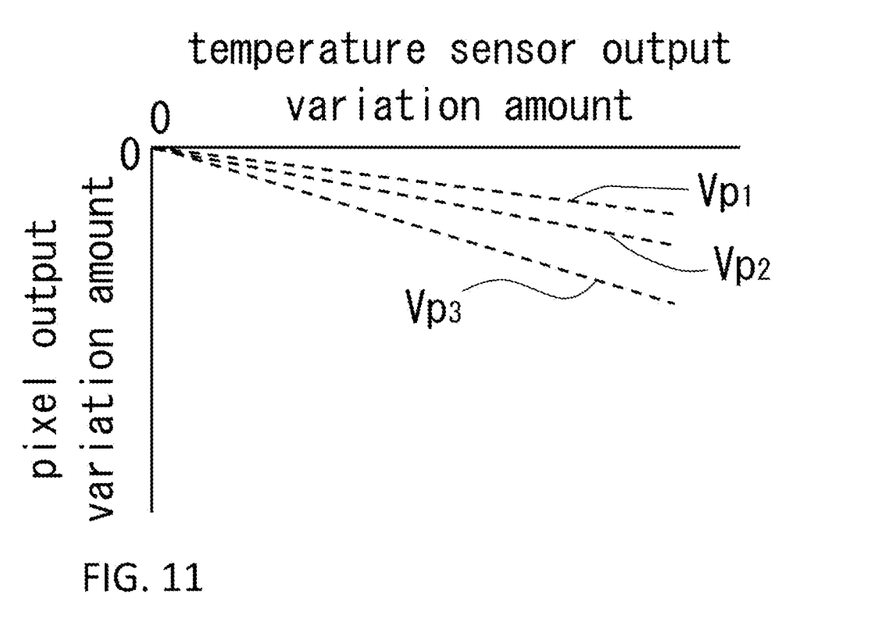
FIG. 11 is a diagram showing a relationship between the change amount of the temperature sensor output and the change amounts of the pixel outputs in the infrared imaging device according to Embodiment 3.

In Embodiment 3, the compensation amount calculation function generation unit shown in Embodiments 1 and 2 as described above is configured by a combination with an initial value acquisition unit, and a function is generated using a variation amount relative to the initial value. FIG. 9 to FIG. 11 are for a description of a configuration of an infrared imaging device of Embodiment 3, FIG. 9 is a functional block diagram showing the configuration of the infrared imaging device, FIG. 10 is a diagram showing the changes over time in the output variation amount of the pixel output and the output variation amount of the temperature sensor output in the infrared imaging device, and FIG. 11 is a diagram showing a relationship between the output variation amount of the temperature sensor output and the output variation amount of the pixel output in the infrared imaging device.

Note that, in the infrared imaging device according to Embodiment 3, the configuration except for the part directly related to the initial value acquisition unit and the compensation amount calculation function generation unit is the same as the configuration described in Embodiment 1, and FIG. 2 to FIG. 7 described in Embodiment 1 are referred to, and descriptions on the same components are not repeated.

In the infrared imaging device 10 according to Embodiment 3, as shown in FIG. 9, the compensation amount calculation function generation unit 5 and the initial value acquisition unit 8 are provided in place of the single formation of the compensation amount calculation function generation unit 5 among the components described in FIG. 1 of Embodiment 1. The initial value acquisition unit 8 is configured to receive the pixel output Sp from the A/D converter 2, and the compensation amount calculation function generation unit 5 is configured to receive the pixel output Sp and the temperature sensor output St. Further, the timing control unit 6 is configured to generate a control or operation command signal to execute the operation of the shutter 3, the initial value acquisition unit 8, and the compensation amount calculation function generation unit 5 in synchronization with each other.

The initial value acquisition unit 8 holds a shutter imaging signal (pixel output Sp) output from the A/D converter 2 and a temperature sensor output St output from the substrate temperature sensor 4 as initial values when the shutter is operated in response to the first control signal from the timing control unit 6 after the start-up. The compensation amount calculation function generation unit 5 calculates output variation amounts Vp and Vt relative to the initial values, for the pixel output Sp output from the A/D converter 2 and the temperature sensor output St output from the substrate temperature sensor 4 with respect to subsequent control signals.

That is, when the first control signal among the control signals of the timing control unit 6 is received, the received data is stored as the initial values, and for the second and subsequent control signals, the output variation amounts Vp and Vt relative to the initial values in the received data are calculated and temporarily stored in the memory. Then, a second N-th order approximate function Af is generated from the relationship between the output variation amount Vt of the temperature sensor output St and the output variation amount Vp of the pixel output Sp.

The temperature drift compensation amount calculation unit 7 calculates the temperature drift compensation amount Dc in accordance with the output variation amount Vt of the temperature sensor output St from the second N-th approximate function Af obtained by the compensation amount calculation function generation unit 5. Accordingly, the output variation amount Vp of the pixel output Sp generated from the infrared imaging device 1 and output via the A/D converter 2 can be predicted in accordance with the temperature sensor output St. Lastly, by subtraction operation of the initial value output from the initial value acquisition unit 8 and the temperature drift compensation amount Dc output from the temperature drift compensation amount calculation unit 7 from the pixel output Sp output from the A/D converter 2, the output for each of the pixels 1p can be leveled.

Next, the compensation contents will be described in more detail. The output variation amount Vp relative to the initial value in the pixel output Sp for each of the pixels 1p output from the A/D converter 2 (Vp1, Vp2, and Vp3 corresponding to pixel outputs Sp1, Sp2, and Sp3 are indicated as representatives), which is calculated by the compensation amount calculation function generation unit, changes with time as shown in FIG. 10. Similarly, the output variation amount Vt from the initial value in the temperature sensor output St from the substrate temperature sensor 4 also changes with time.

When the infrared imaging device 10 is turned on (time=0), the substrate temperature varies owing to heat generation caused by energization. The output variation amount Vt of the temperature sensor output St relative to the initial value obtained at the timing when the first control signal is issued from the timing control unit 6 increases with time. While the infrared imaging device 1 shows the same tendency in the temperature change as the substrate temperature sensor 4, the temperature of the shutter 3, which is in the same temperature as the ambient temperature, does not change, so that the output variation amount Vp of the pixel output Sp relative to the initial value decreases with time.

From the output variation amount of Vt of the temperature sensor output St and the output variation amount of Vp of the shutter imaging signal which change over time when the device starts up and which are described in FIG. 10, it can be plotted as a relationship between the output variation amount Vp of each of the pixels 1p with respect to the output variation amount of Vt as shown in FIG. 11. Then, the compensation amount calculation function generation unit 5 generates the second function Af of the output variation amount Vp for each of the pixels 1p from the output variation amount Vp that is relative to the initial value and calculated from the pixel output Sp for each of the pixels 1p, and the output variation amount Vt relative to the initial value of the temperature sensor output St, and outputs the second function Af to the temperature drift compensation amount calculation unit 7.

The temperature drift compensation amount calculation unit 7 substitutes the output variation amount Vt output from the compensation amount calculation function generation unit 5 at the point in time into the second N-th approximate function Af for each of the pixels 1p output from the compensation amount calculation function generation unit 5 to generate the temperature drift compensation amount Dc for each of the pixels 1p. The generated temperature drift compensation amount Dc for each of the pixels 1p takes into account all of the mounting condition of the infrared imaging device 10, the fluctuation of the power supply voltage to be applied, the influence of the temperature change in the lens barrel and the optical system members, and the temperature drift component difference for each of the pixels 1p.

Here, the compensation amount calculation function generation unit 5 does not consider the output level difference in each of the pixels 1p. However, the function can be substituted by holding the signal of the A/D converter 2 at the timing when the first control signal is issued from the timing control unit 6 in the initial value acquisition unit 8. That is, by the subtraction operation of the initial value for each of the pixels 1p output from the initial value acquisition unit 8 and the temperature drift compensation amount Dc obtained in the compensation amount calculation function generation unit 5, from the pixel output Sp from the A/D converter 2, the output for each of the pixels 1p can be leveled.

Then, the compensation amount calculation function generation unit 5 according to Embodiment 3 improves the accuracy of the second N-th order approximate function by self-learning and optimizes the shutter calibration timing, similar to the description in Embodiment 1. As a result, the function implemented by the combination of the compensation amount calculation function generation unit 5 and the temperature drift compensation amount calculation unit 7 in Embodiment 1 is maintained.

In addition, the data size handled by the compensation amount calculation function generation unit 5 and the temperature drift compensation amount calculation unit 7 for sequentially generating the temperature drift compensation amount Dc using the output of the compensation amount calculation function generation unit 5 is reduced, the calculation load of the circuit can be suppressed, and the cost of the constituent members can be reduced. Further, since the calculation speed can be improved, it is possible to perform compensation processing compatible with a large number of pixels.

Embodiment 4

Figure 12:
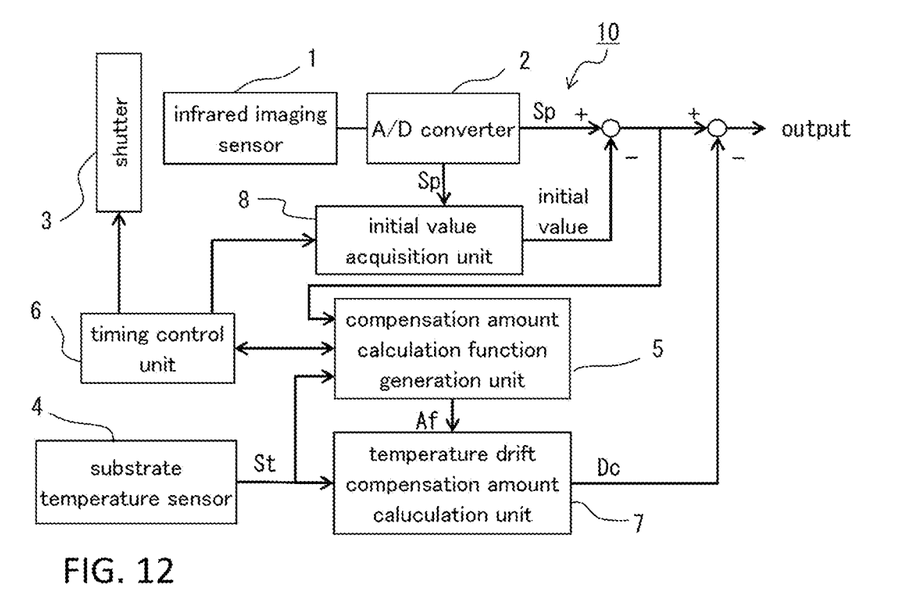
FIG. 12 is a functional block diagram of an infrared imaging device according to Embodiment 4.

In Embodiment 3, an example has been described in which the compensation amount calculation function generation unit itself calculates the variation amount of the pixel output by using the initial value held in accordance with the number of times of the control signal, but this is not a limitation. In Embodiment 4, with regard to the pixel output, an example will be described in which the variation amount calculated by the subtraction of the initial value is output to the compensation amount calculation function generation unit. FIG. 12 is a functional block diagram showing an entire configuration of the infrared imaging device according to Embodiment 4. In the infrared imaging device according to Embodiment 4, the configuration except for the part related to the calculation of the variation amount of the pixel output is the same as the configuration described in Embodiment 3, and FIGS. 10 to 11 described in Embodiment 3 are referred to, and the descriptions on the same components are not repeated.

Instead of the pixel output Sp of the A/D converter 2 described in Embodiment 3, as shown in FIG. 12, the infrared imaging device 10 according to Embodiment 4 outputs the output variation amount Vp which is subtracted by using the initial value of the initial value acquisition unit 8, to the compensation amount calculation function generation unit 5. That is, among the control signals of the timing control unit 6 shown in Embodiment 3, the same processing as that extracting only the output variation amounts for the second and subsequent signals is possible, and the same effect as in Embodiment 3 can be obtained. With this configuration, the subtraction processing is further simplified, the circuit load can be suppressed, and the cost of the constituent members can be reduced.

Embodiment 5

Figure 13:
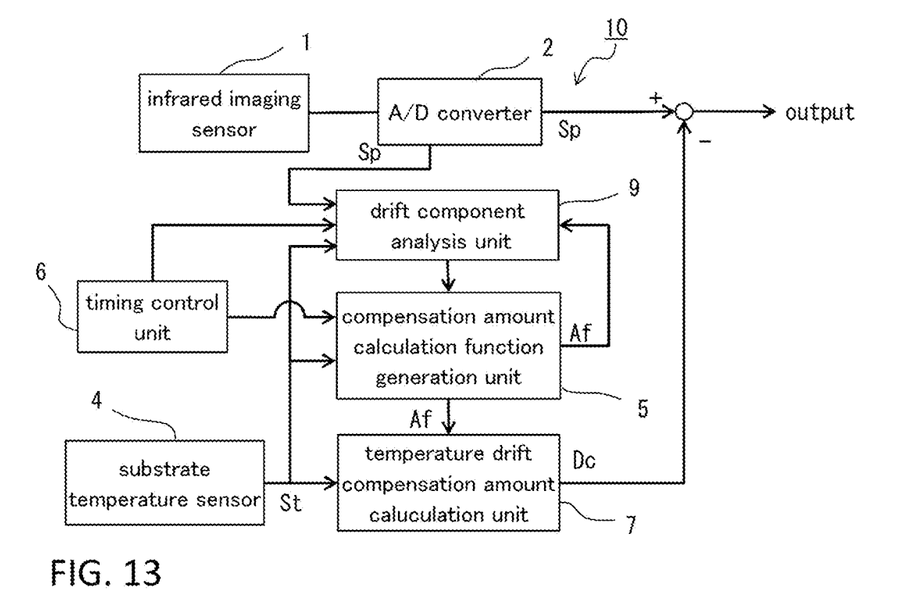
FIG. 13 is a functional block diagram of an infrared imaging device according to Embodiment 5.
Figure 14:
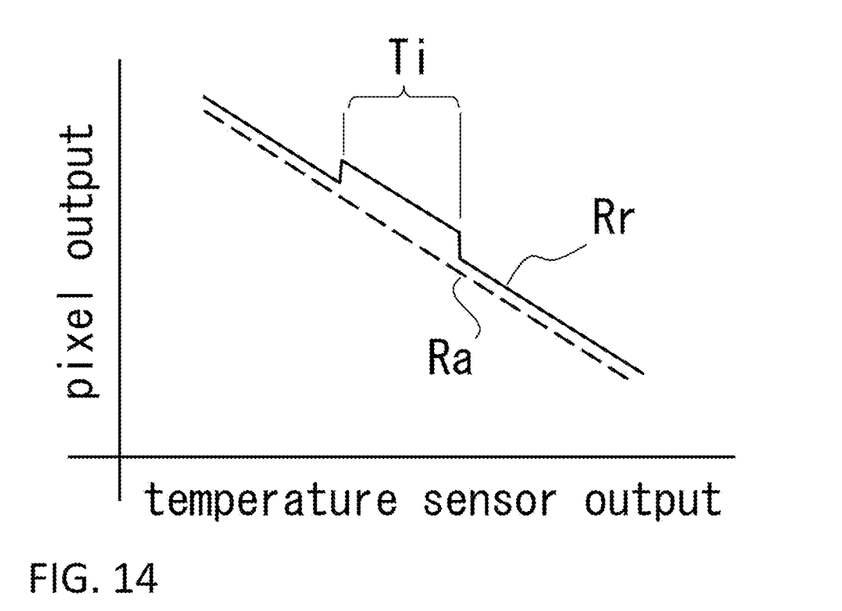
FIG. 14 is a diagram showing a relationship between a temperature sensor output and a pixel output in the infrared imaging device according to Embodiment 5.

In the above-described Embodiments 1 to 4, the example in which an approximate formula is generated using the pixel output obtained by capturing the shutter image has been described, but this is not a limitation. In Embodiment 5, an example of generating an approximate formula using data obtained by capturing an image of a subject will be described. FIG. 13 and FIG. 14 are diagrams for illustrating the configuration of an infrared imaging device according to Embodiment 5, and FIG. 13 is a functional block diagram showing the configuration of the infrared imaging device, and FIG. 14 is a diagram showing data calculated by an N-th order approximate formula and data obtained by imaging as a relationship between sensor outputs and pixel outputs in the infrared imaging device.

In the infrared imaging device according to Embodiment 5, the same components as those described in Embodiments 1 to 4 can be applied to the components except for the omission of the shutter and a part related to a drift component analysis unit provided for analyzing a drift component, and FIG. 2 to FIG. 7 described in Embodiment 1 are referred to, and the descriptions on the same components are not repeated.

As shown in FIG. 13, the infrared imaging device 10 according to Embodiment 5 also includes an infrared imaging sensor 1 that receives incident infrared light and converts it into an electric signal, and an A/D converter 2 that receives the signal and performs digital conversion. Also provided are the substrate temperature sensor 4 for measuring the temperature of the mounting substrate, and the temperature drift compensation amount calculation unit 7 for calculating the temperature drift compensation amount for compensating the digital value outputted from the A/D converter 2 by subtraction processing in accordance with the output of the substrate temperature sensor 4.

In addition, the present embodiment is similar to Embodiment 1 in that it includes the compensation amount calculation function generation unit 5 for generating an N-th order approximate function Af for calculating a temperature drift compensation amount by the self-learning, and the timing control unit 6 for controlling the timing for the calibration. In contrast, the output from the A/D converter 2 is not directly output to the compensation amount calculation function generation unit 5, but is passed through the drift component analysis unit 9 to select whether it is used for the calibration or not before being output to the compensation amount calculation function generation unit 5, and the shutter 3 is omitted.

The drift component analysis unit 9 calculates a deviation amount (drift component) from the output value calculated from the temperature sensor output St with respect to the pixel output Sp output from the A/D converter 2 on the basis of the function Af output from the compensation amount calculation function generation unit 5. For example, in the case where the drift component is defined in the same manner as the deviation value with respect to the value calculated by the function Af, it is determined whether the drift component falls within a preset range in the same way as determined whether the deviation value is larger than the threshold value Th described in Embodiment 1. When the timing control unit 6 commands that it is the timing for a calibration, the data of the pixel 1p whose drift component is out of the range among the pixel outputs Sp is excluded and outputs to the compensation amount calculation function generation unit 5. That is, the drift component analysis unit 9 of Embodiment 5 functions as a data selection unit in the function generation, which is similar to the self-learning operation of the compensation amount calculation function generation unit 5 in Embodiment 1.

When the calibration instruction is issued from the timing control unit 6, since the shutter 3 is not used in Embodiment 5, the pixel output Sp obtained by imaging the subject is acquired. At this time, when the imaging angle is fixed and the state of the subject does not change, the relationship Rr between the pixel output Sp obtained by the imaging and the temperature sensor output St should be the same as the relationship Ra between the pixel output Sp and the temperature sensor output St that are approximated by the function Af. Here, for example, when a moving object such as a person or an animal enters the field of view, as shown in FIG. 14, the relationship Rr between the pixel output Sp obtained by imaging the subject and the temperature sensor output St drifts from the relationship Ra at the imaging timing Ti when the moving object enters the field of view.

In other words, when the pixel output from the pixel 1p having a large drift component is excluded during the calibration, the pixel on which the moving object is reflected in the imaging data is excluded from the calibration target. As a result, it is possible to separate from the temperature drift component the imaging component in which the moving object is reflected. With this method, by extracting only the temperature drift component and outputting it to the compensation amount calculation function generation unit 5, it is possible to generate the N-th order approximate function Af shown in Embodiments 1 to 4, and it becomes possible to generate the temperature drift compensation amount Dc in the temperature drift compensation amount calculation unit 7.

Thus, during the subject imaging in a normal situation, the output of each pixel 1p is leveled by subtraction operation of the temperature drift compensation amounts Dc output from the temperature drift compensation amount calculation unit 7 from the pixel outputs Sp of all pixels output from the A/D converter 2. As a result, it is possible to perform a sequential calculation with respect to the substrate temperature change, and it is possible to level the image signal with high accuracy.

However, the temperature drift compensation amount Dc generated in this configuration includes a component of a stationary subject, that is, a component of the background information. Therefore, the background information is canceled by the subtraction operation and cannot be acquired, but the infrared imaging device 10 can be provided in which imaging signals of the moving subject can be acquired and the shutter 3 is not required. Further, it is possible to create compensation data in consideration of the mounting condition of the device, the fluctuation of the power supply voltage to be applied or the like, thereby keeping effects in that the image compensation can be performed with high accuracy and a significant reduction in manufacturing cost can be achieved.

Figure 15:
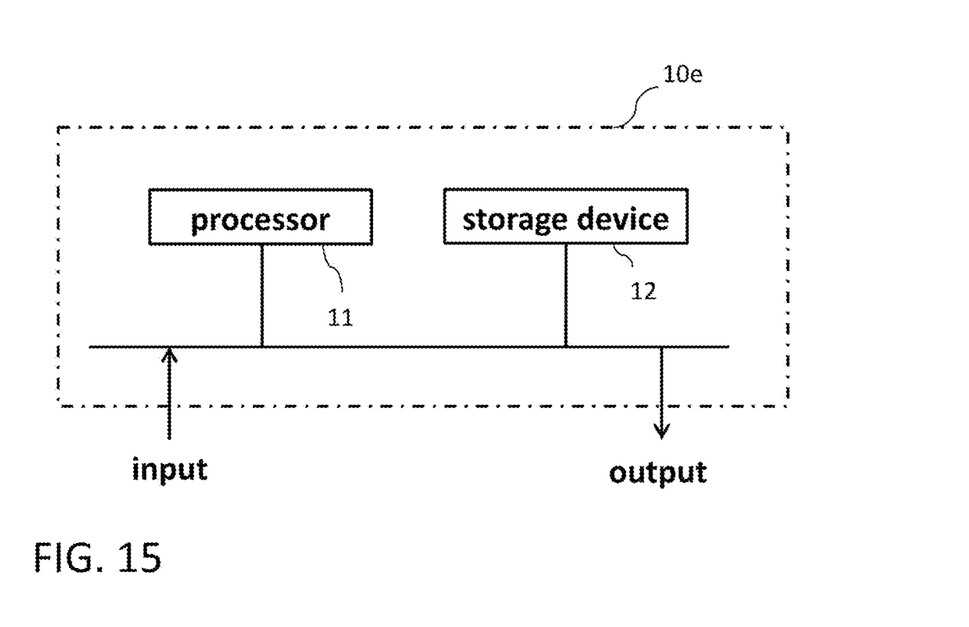
FIG. 15 is a block diagram showing a configuration example of a part for executing arithmetic processing in the infrared imaging device according to each embodiment.

As shown in FIG. 15, the infrared imaging device 10 may be configured by a single piece of hardware 10e including a processor 11 and a storage device 12 to perform arithmetic processing (for example, compensation amount calculation function generation unit 5 to drift component analysis unit 9). Although not shown, the storage device 12 includes a volatile storage device such as a random-access memory and a nonvolatile auxiliary storage device such as a flash memory. Further, instead of the flash memory, a hard disk auxiliary storage device may be provided. The processor 11 executes a program input from the storage device 12. In this case, the program is input from the auxiliary storage device to the processor 11 via the volatile storage device. The processor 11 may output data such as the calculation result to the volatile storage device of the storage device 12 or may store the data in the auxiliary storage device via the volatile storage device.

Note that, although various exemplary embodiments and examples are described in the present specification, various features, aspects, and functions described in one or more embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

For example, although in Embodiment 5, the difference from Embodiment 1 has been described, this is not a limitation, and the same effects can be achieved even if it is configured to include the difference with respect to any one of Embodiments 2 to 4 or the difference from a combination of these embodiments. Furthermore, for example, an example has been shown in which the function of the output variation amount Vp of the pixel 1p is generated using the output variation amount Vt of the substrate temperature sensor 4 as an independent variable, but the present invention is not limited thereto. The function of the output variation amount Vp of the pixel output Sp may have the temperature sensor output St as the independent variable. Further, the function Af is not limited to the N-th order approximation, and any function may be used as long as it can calculate the compensation amount with the substrate temperature as the independent variable and can be generated by combining a plurality of pieces of data.

As described above, the infrared imaging device 10 according to each embodiment comprises the infrared imaging sensor 1 in which the plurality of pixels 1p for detecting incident infrared light as heat are arrayed, the substrate temperature sensor 4 to measure the temperature of the substrate on which the infrared imaging sensor 1 is mounted, the temperature drift compensation amount calculation unit 7 to calculate the temperature drift compensation amount Dc in accordance with the temperature change of the substrate (change in temperature sensor output St), with respect to a pixel output Sp outputted from each of the plurality of pixels 1p, a function generation unit (compensation amount calculation function generation unit 5) to generate the function Af for calculating the temperature drift compensation amount Dc with the temperature of the substrate (value of temperature sensor output St) as an independent variable, and the timing control unit 6 to cause the infrared imaging sensor 1 and the substrate temperature sensor 4 to synchronously output data to the function generation unit during a period (for example, periods Pb to Pd, period Pe) in which the temperature of the substrate changes along with a start of energization to the substrate, as data for generation to generate the function Af, wherein the function generation unit uses the data for generation output after the generation of the function Af as additional data for improving accuracy of the function Af, so that the infrared imaging device 10 can be obtained in which the influence of the mounting condition and the voltage fluctuation is reduced, and the number of the calibrations is reduced to shorten the time when no image can be captured.

In addition, since the function generation unit (compensation amount calculation function generation unit 5 or drift component analysis unit 9) excludes, from the additional data, a pixel output that deviates from a range (e.g., approximate value±threshold value Th) set for a value calculated from the function Af among the pixel outputs Sp constituting the additional data, it is possible to exclude data that has become inaccurate due to a change in the situation or noise etc. Furthermore, as explained in the operation of the drift component analysis unit 9, which should be referred to as the data selection part of the function generation unit in Embodiment 5, the calibration can be performed by removing pixel outputs Sp corresponding to moving objects even when the shutter 3 is not used.

Further, if the function generation unit (compensation amount calculation function generation unit 5 or drift component analysis unit 9) excludes, from the data for generation, a pixel output that deviates from a range (e.g., approximate value±threshold value Th) set for a value calculated from the function Af among the pixel outputs Sp constituting the data for generation (including additional data) and generates the function Af again, data that is no longer necessary in the current situation due to a change in the situation can be excluded. Furthermore, as explained in the operation of the drift component analysis unit 9, which should be referred to as the data selection part of the function generation unit in Embodiment 5, the calibration can be performed by removing pixel outputs Sp corresponding to moving objects even when the shutter 3 is not used.

Meanwhile, if the function generation unit (compensation amount calculation function generation unit 5) analyzes a distribution state in the temperature of the substrate constituting the data for generation, and sets a timing at which data of the temperature of the substrate corresponding to a sparsely distributed region can be obtained as a timing of the synchronous output in the calibration, then the function Af can be made more accurate without increasing the number of calibrations.

Further, if the function generation unit (compensation amount calculation function generation unit 5) analyzes the dispersion state of the data for generation in the function Af and sets the timing at which the temperature data of the substrate corresponding to the region with large dispersion can be obtained as the timing of the synchronous output in the calibration, then without increasing the number of calibrations, the data in the region with a large temperature drift can be reliably supplemented so that an accurate compensation can be performed.

At this time, the function generation unit (compensation amount calculation function generation unit 5) can reliably obtain desired data by setting the timing of the synchronous output based on at least one of the time from the start of energization and the temperature of the substrate.

A shutter 3 to block incident light on the infrared imaging sensor 1 is provided, and since the timing control unit 6 causes the shutter 3 to be synchronously in a blocking state when the data for generation is made to output, so that the calibration can be reliably performed.

The function Af is an N-th order approximation of the pixel outputs Sp or the output variation amounts Vp of the pixel outputs, with the temperature of the substrate as an independent variable, and when a higher order approximation of the N-th order approximation is performed for higher accuracy, the compensation can be reliably performed with a simple calculation.

DESCRIPTION OF REFERENCE NUMERALS AND SIGNS

1: infrared imaging sensor, 1g: pixel part, 1p: pixel, 1r: readout circuit, 1s: drive line selection circuit, 2: A/D converter, 3: shutter, 4: substrate temperature sensor, 5: compensation amount calculation function generation unit (function generation unit), 6: timing control unit, 7: temperature drift compensation amount calculation unit, 8: initial value acquisition unit, 9: drift component analysis unit (function generation unit), 10: infrared imaging device, Af: function, Av: allowable value, Dc: temperature drift compensation amount (compensation amount), Sp: pixel output, Spr: representative pixel output, St: temperature sensor output, Th: threshold value, Vp: output variation amount, Vt: output variation amount

The invention claimed is:

1. An infrared imaging device, comprising:
an infrared imaging sensor in which a plurality of pixels for detecting incident infrared light as heat are arrayed;
a substrate temperature sensor to measure a temperature of a substrate on which the infrared imaging sensor is mounted;
a temperature drift compensation amount calculator to calculate a temperature drift compensation amount in accordance with a temperature change of the substrate, with respect to a pixel output outputted from each of the plurality of pixels;
a function generator to generate a function for calculating the temperature drift compensation amount with the temperature of the substrate as an independent variable; and
a timing controller to cause the infrared imaging sensor and the substrate temperature sensor to synchronously output data to the function generator during a period in which the temperature of the substrate changes along with a start of energization to the substrate, as data for generation to generate the function, wherein
the function generator uses the data for generation output after the generation of the function as additional data for improving accuracy of the function.

2. The infrared imaging device according to claim 1, wherein the function generator excludes, from the additional data, a pixel output that deviates from a range set for a value calculated using the function among the pixel outputs constituting the additional data.

3. The infrared imaging device according to claim 1, wherein the function generator excludes, from the data for generation, a pixel output that deviates from a range set for a value calculated by using the function among the pixel outputs constituting the data for generation and generates the function again.

4. The infrared imaging device according to claim 2, wherein the function generator excludes, from the data for generation, a pixel output that deviates from a range set for a value calculated by using the function among the pixel outputs constituting the data for generation and generates the function again.

5. The infrared imaging device according to claim 1, wherein the function generator analyzes a distribution state in the temperature of the substrate constituting the data for generation, and sets a timing at which data of the temperature of the substrate corresponding to a sparsely distributed region can be obtained as a timing of the synchronous output.

6. The infrared imaging device according to claim 2, wherein the function generator analyzes a distribution state in the temperature of the substrate constituting the data for generation, and sets a timing at which data of the temperature of the substrate corresponding to a sparsely distributed region can be obtained as a timing of the synchronous output.

7. The infrared imaging device according to claim 3 wherein the function generator analyzes a distribution state in the temperature of the substrate constituting the data for generation, and sets a timing at which data of the temperature of the substrate corresponding to a sparsely distributed region can be obtained as a timing of the synchronous output.

8. The infrared imaging device according to claim 1, wherein the function generator analyzes a dispersion state of the function in the data for generation, and sets a timing at which the temperature data of the substrate corresponding to a region having a large dispersion can be obtained as a timing of the synchronous output.

9. The infrared imaging device according to claim 2, wherein the function generator analyzes a dispersion state of the function in the data for generation, and sets a timing at which the temperature data of the substrate corresponding to a region having a large dispersion can be obtained as a timing of the synchronous output.

10. The infrared imaging device according to claim 3, wherein the function generator analyzes a dispersion state of the function in the data for generation, and sets a timing at which the temperature data of the substrate corresponding to a region having a large dispersion can be obtained as a timing of the synchronous output.

11. The infrared imaging device according to claim 5, wherein the function generator analyzes a dispersion state of the function in the data for generation, and sets a timing at which the temperature data of the substrate corresponding to a region having a large dispersion can be obtained as a timing of the synchronous output.

12. The infrared imaging device according to claim 5, wherein the function generator sets the timing based on at least one of a time from the start of energization and the temperature of the substrate.

13. The infrared imaging device according to claim 8, wherein the function generator sets the timing based on at least one of a time from the start of energization and the temperature of the substrate.

14. The infrared imaging device according to claim 1, further comprising a shutter to block incident light on the infrared imaging sensor, wherein
the timing controller causes the shutter to be synchronously in a blocking state when the data for generation is made to output.

15. The infrared imaging device according to claim 2, further comprising a shutter to block incident light on the infrared imaging sensor, wherein
the timing controller causes the shutter to be synchronously in a blocking state when the data for generation is made to output.

16. The infrared imaging device according to claim 3, further comprising a shutter to block incident light on the infrared imaging sensor, wherein
the timing controller causes the shutter to be synchronously in a blocking state when the data for generation is made to output.

17. The infrared imaging device according to claim 1, wherein the function is an N-th order approximation of the pixel outputs or variation amounts of the pixel outputs with the temperature of the substrate as an independent variable, and a higher order approximation of the N-th order approximation is performed for higher accuracy.

18. The infrared imaging device according to claim 2, wherein the function is an N-th order approximation of the pixel outputs or variation amounts of the pixel outputs with the temperature of the substrate as an independent variable, and a higher order approximation of the N-th order approximation is performed for higher accuracy.

19. The infrared imaging device according to claim 3, wherein the function is an N-th order approximation of the pixel outputs or variation amounts of the pixel outputs with the temperature of the substrate as an independent variable, and a higher order approximation of the N-th order approximation is performed for higher accuracy.

* * * * *